United States Patent [19]
Bizet et al.

[11] Patent Number: 5,076,376
[45] Date of Patent: Dec. 31, 1991

[54] STRAIN GAUGE WEIGHING DEVICE

[75] Inventors: Bruno Bizet, Charnay les Macon; Alain Colloud, Thonon les Bains; Bernard Lavillat, Annecy, all of France

[73] Assignee: Terraillon, societe anonyme, Juvigny, France

[21] Appl. No.: 527,023

[22] Filed: May 22, 1990

[30] Foreign Application Priority Data

May 30, 1989 [FR] France .................. 89 07489

[51] Int. Cl.$^5$ .................. G01G 3/08; G01G 3/14; G01L 1/22
[52] U.S. Cl. .................. 177/229; 177/211; 73/862.65
[58] Field of Search .................. 177/211, 229; 73/862.65

[56] References Cited

U.S. PATENT DOCUMENTS

| 2,859,613 | 11/1958 | Green .................. 177/211 |
| 4,655,305 | 4/1987 | Jacobson .................. 177/211 |

FOREIGN PATENT DOCUMENTS

| 0086874 | 10/1982 | European Pat. Off. . |
| 0089209 | 3/1983 | European Pat. Off. . |
| 0153121 | 2/1985 | European Pat. Off. . |
| 0295067 | 6/1988 | European Pat. Off. . |
| 57-20630 | 2/1982 | Japan . |
| 61-184433 | 8/1986 | Japan .................. 73/862.65 |
| 658909 | 12/1986 | Switzerland . |
| 1263182 | 2/1972 | United Kingdom .................. 177/229 |

Primary Examiner—George H. Miller, Jr.
Attorney, Agent, or Firm—Ratner & Prestia

[57] ABSTRACT

The invention discloses a strain gauge weighing device in which the load cell comprises a not very flattened flexion bar associated with a flat and wide parallel secondary plate connecting a mobile upright to a fixed upright. A platform is fast with the mobile upright whereas a base is fast with the fixed upright. Strain gauges are spaced apart on the surface of the flexion bar and connected in a Wheatstone bridge for measuring the load.

5 Claims, 5 Drawing Sheets

STRAIN GAUGE WEIGHING DEVICE

BACKGROUND OF THE INVENTION

1. Field of the Invention

The present invention relates to load cells, used particularly in the construction of weighing scales such as bathroom scales, food scales or any other weighing apparatus with a platform.

Platform weighing appliances are generally formed of a base resting on the floor and a platform substantially parallel to this base. The platform is intended to receive the load to be weighed.

2. Description of the Prior Art

Between the base and the platform a load cell is disposed comprising strain gauges connected electrically in a Wheatstone bridge arrangement and delivering an electric signal proportional to the load applied to the platform. The load cell comprises a resiliently deformable flexion bar disposed in a direction substantially perpendicular to the force to be measured, i.e. substantially parallel to the platform. A mobile upright connects the platform to a first end of the flexion bar, the mobile upright being generally parallel to the direction of the force to be measured. A fixed upright, also generally parallel to the force to be measured connects the base to the second end of the flexion bar. The strain gauges are fixed on the surface of the flexion bar and are sensitive to the extension and shortening of said surface generated by the flexion of said bar. Such a structure is described for example in the document FR-A-2 177 923.

The difficulty with load cells resides in the fact that the electric signal which is obtained is sensitive to the position of the load on the platform. In fact, the flexional characteristics of the flexion bar vary both as a function of the longitudinal off-setting of the load on the platform, or position in the length direction of the flexion bar, and as a function of the transverse off-set of the load on the platform, or position in the direction perpendicular to the length of the flexion bar. The longitudinal displacement of the load introduces a variation in the torsion torque applied to the first end of the flexion bar by the mobile upright along a longitudinal axis. These torsional stresses deform the flexion bar and disturb the measurement of its flexion by the strain gauges.

In the document FR-A-2 177 923, the effects of the longitudinal displacement of the load on the platform are compensated for by disposing several strain gauges in at least two zones offset longitudinally on the flexion bar. The device however remains sensitive to the displacement of the load in a transverse direction.

Load cells are known made from a single block and machined so as to make them insensitive to the transverse off-setting of the load. Such load cells, described for example in the document EP-A-0 153 121 or EP-A-0 089 209 are however very costly because of the precise machining which they require. Such machining must be achieved by successive approximations and depends on a large number of parameters, making large scale manufacture without re-treatment illusory.

The document WO-A-8 402 186 teaches making such a load cell insensitive to the transverse offset of the load by using additional strain gauges sensitive to the torsion of the flexion bar. This approach involves using additional gauges, which must be disposed very accurately on the flexion bar and requires subsequent adjusting of the electric signals. Experience shows that such adjustment is very often insufficient and requires precise machining of the flexion bar. Furthermore, it is necessary to increase the number of strain gauges, which increases the connection to be made during fitting, increases the risks of breakdown and substantially increases the cost.

The document CH-A-658 909 teaches reducing the measurement differences due to offsetting of the load by using two blades (A1, A2) of the same lengths (1), parallel to each other, of the same width and spaced apart by a constant distance (A). Two straib gauges (D1, D2) are disposed on the first blade (A1) in spaced positions towards the ends of the blade. It is however apparent that such a two blade structure substantially reduces the deformation undergone by the assembly of the two blades (A1, A2) for the same flexional force and divides the sensitivity of the device. Furthermore, the presence of the two flat blades substantially increases the damping time of the oscillations when a load is placed on the device, which considerably affects its use.

Thus, the known solutions require expensive adjustment during the manufacture of the weighing appliances, or reduce the sensitivity and the mechanical damping capacities of the load cell.

A problem set by the present invention is to construct a strain gauge load cell, of simple design and structure so as to be of a low cost price, which has good sensitivity and a low damping time of the oscillations and which, by construction, is practically insensitive to the offset of the load, longitudinally and/or transversely.

According to the invention, the advantages are obtained without increasing the number of strain gauges and without requiring precise machining adjustments during manufacture. Furthermore, another problem set by the invention is to obtain insensitivity to the longitudinal offset of the load while avoiding dispersing the strain gauges in several zones spaced apart over the length of the flexion bar. Such dispersion in fact complicates the electric connection operations during mounting. Thus, the invention makes it possible to gather together all the strain gauges in a single zone of the flexion bar.

For that, a first idea which is at the base of the invention consists in using a load cell with two flexion beams, by specializing the two flexion beams so that each one fulfils particular functions: the first relatively thick and narrow beam, carrying the strain gauges, increases the sensitivity of the measurement and increases the mechanical damping; a second beam, relatively thin and wide, takes up the torsional forces along the longitudinal axis without exaggeratedly reducing the measurement sensitivity.

A second idea at the base of the invention results from the surprising observation that the effects of longitudinal offsetting of the load are appreciably modified when the two flexion beams are not parallel to each other.

SUMMARY OF THE INVENTION

Thus, to attain these objects as well as others, the strain gauge according to the invention comprises:
- a first resiliently deformable flexion beam disposed in a direction substantially perpendicular to the direction of the force to be measured,
- a second resiliently deformable flexion beam disposed in a direction substantially parallel to the first flexion beam,
- a mobile upright fixed to a first end of the flexion beams and generally parallel to the direction of the force to be measured, intended to be fixed to a platform receiving the load to be measured, a fixed upright fast with the second end of the flexion beams and generally parallel to the direction of the force to be measured, to be fixed to a base, strain gauges, fixed on the surface of the first flexion beam for electric connection to an electric measurement circuit for delivering an electric signal as a function of the deformation by flexion of the first flexion beam under the action of the mechanical force applied between the fixed and mobile uprights;

the first flexion beam is a resiliently deformable flexion beam, which is not very flat, having a thickness E and a width 1 and carrying the strain gauges on one at least of its upper or lower faces, generally perpendicular to the direction of the force to be measured;

the second flexion beam is a resiliently flexible blade, flat and wide, of small thickness e, of large width L and disposed in the plane generally perpendicular to the direction of the force to be measured;

the thickness E of the flexion bar is greater than the thickness e of the blade, the width L of the blade being greater than the width 1 of the flexion bar.

Such a load cell structure has, by construction, good insensitivity to the transverse offset of the load, good measurement sensitivity, and good damping of the mechanical oscillations.

In the applications to a weighing device with receiving platform, the mobile upright is fixed to a load receiving platform extending over a length L1 parallel to the flexion bar and over a width L2 perpendicular to the flexion bar; the secondary blade advantageously has a substantially constant width close to the width L2 of the load receiving platform.

In one embodiment, the insensitivity to the longitudinal offset of the load may be increased by disposing the strain gauges in two symmetrical zones along the first flexion bar.

In an advantageous embodiment, the strain gauges are disposed in a single zone of the flexion bar, spaced away from the central zone. In this case, the first respective ends of the flexion bar and of the secondary blade are spaced apart from each other by a distance D1 greater than distance D2 separating their second respective ends. Thus, the flexion bar forms with the secondary blade an angle A whose value is determined at the time of designing the load cell so as to compensate for the effects of longitudinal off-centering of the force. An important advantage of this embodiment is that the delicate positional adjustments of the strain gauges are avoided, which adjustments are indispensable in the embodiment with several zones on which the strain gauges are bonded.

This method of compensating for the effects of longitudinal off-centering of the forces may be used in all the load cell structures with two flexion beams. A first possibility consists in using it with two identical flexion beams. An advantageous possibility consists in using it with two different and specialized flexion beams, namely a first relatively thick and narrow beam associated with a second relatively thin and wide beam.

BRIEF DESCRIPTION OF THE DRAWINGS

Other objects, features and advantages of the present invention will be clear from the following description of particular embodiments, with reference to the accompanying drawings in which.

DESCRIPTION OF THE PREFERRED EMBODIMENTS

Figure 1:
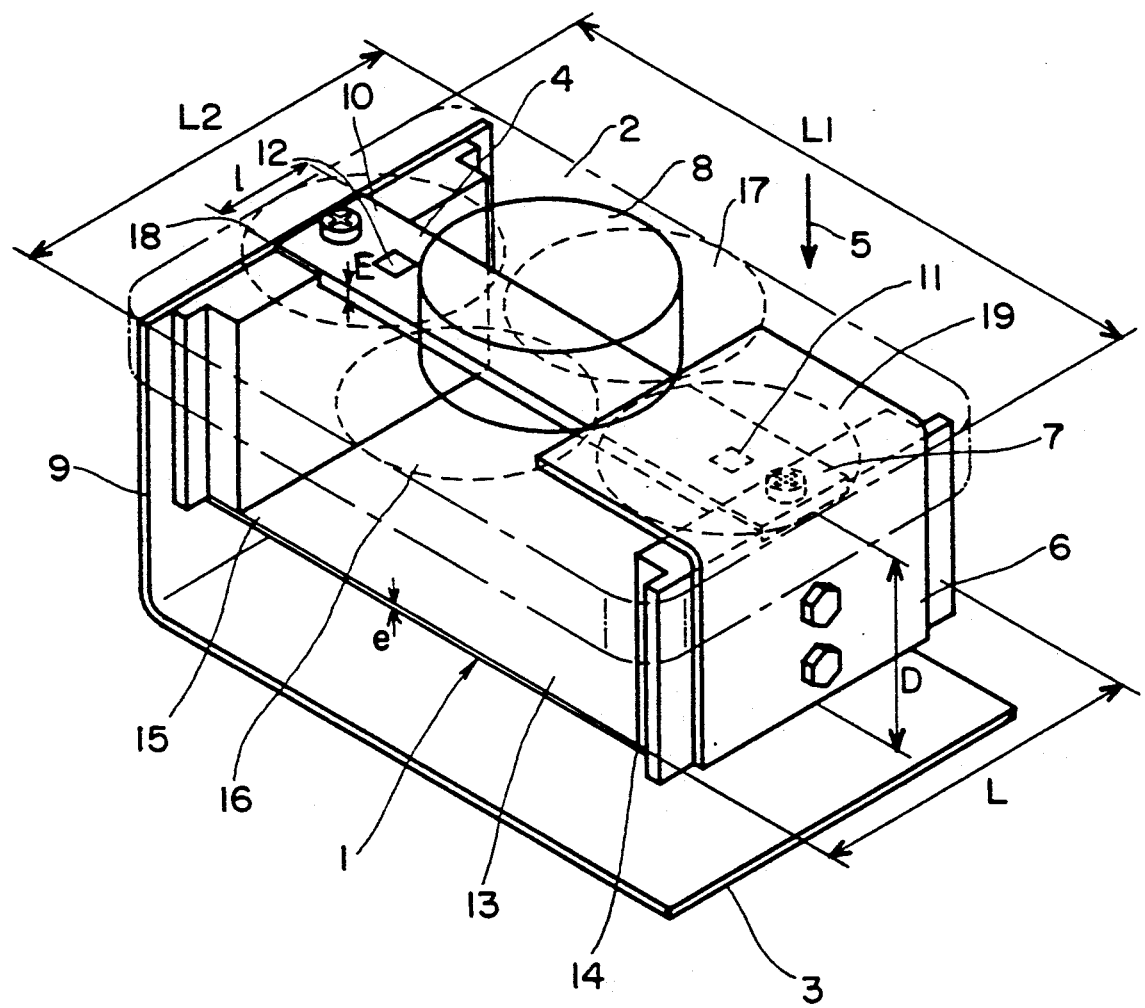
FIG. 1 is a perspective view of a load cell according to the invention associated with a load receiving platform and a base.
Figure 2:
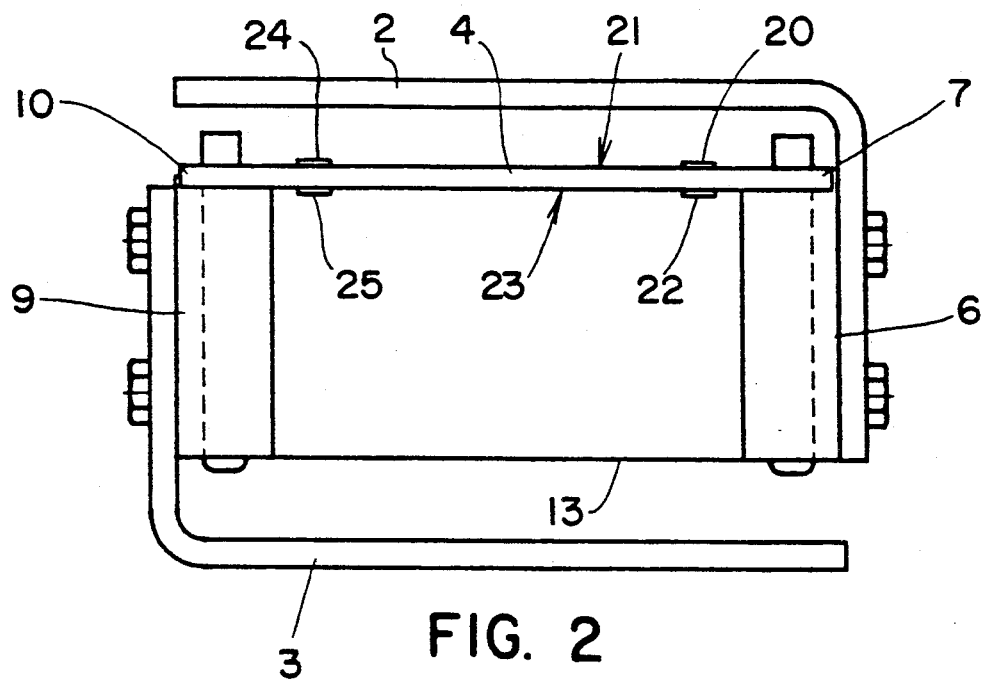
FIG. 2 shows schematically in a side view a load cell in a first embodiment of the invention.
Figure 3:
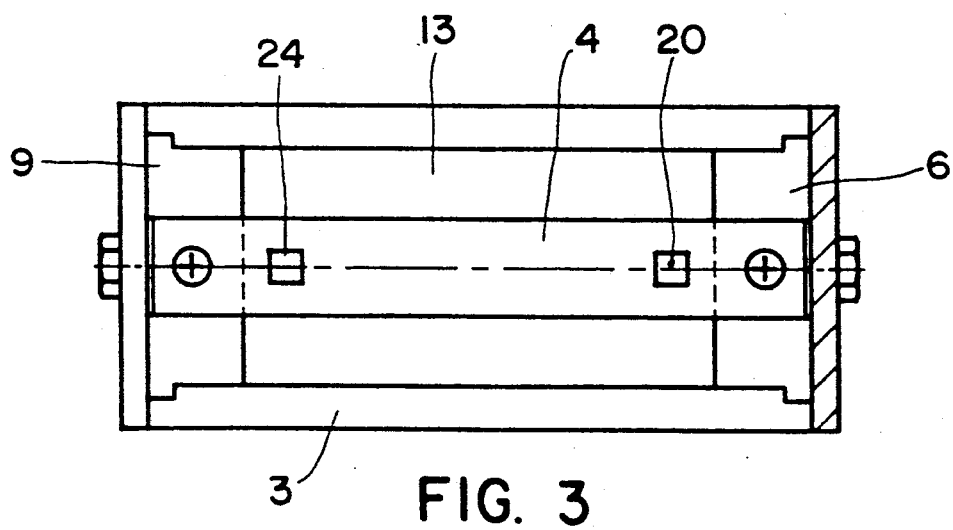
FIG. 3 shows the load cell of FIG. 2 in a top view, with the mobile upright partially in section.
Figure 4:
FIGS. 4 and 5 illustrate on a larger scale the construction of the strain gauges of FIG. 3.
Figure 5:
Figure 6:
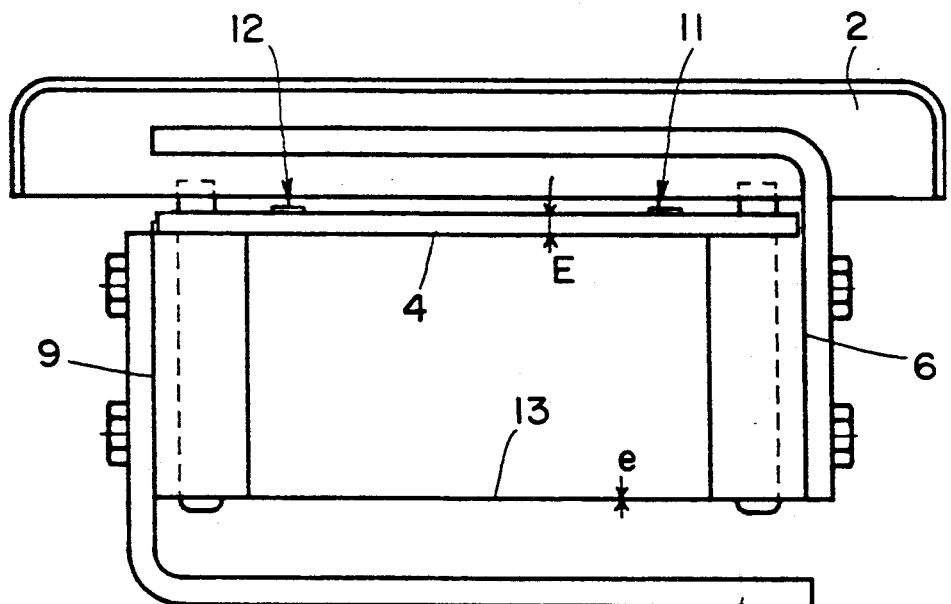
FIG. 6 shows schematically, in a side view, a load cell in a second embodiment of the invention.

In the embodiment shown in FIG. 1, the device of the invention comprises a load cell 1, a load receiving platform 2 and a base 3.

The load cell 1 comprises a flexion bar 4, resiliently deformable by flexion, disposed in a direction substantially perpendicular to the direction 5 of the force to be measured. A mobile upright 6 is fixed to the first end 7 of the flexion bar 4, and is substantially parallel to the direction 5 of the force to be measured. The mobile upright 6 is fixed to the load receiving platform 2 receiving the load 8 to be measured. A fixed upright 9 is fast with the second end 10 of the flexion bar 4 and is substantially parallel to the direction 5 of the force to be measured. The fixed upright 9 is fast with base 3. Strain gauges are fixed on the surface of the flexion bar 4 and are connected electrically to an electric measurement circuit, not shown in the Figure, for delivering an electric signal as a function of the flexional deformation of the flexion bar 4, under the action of the mechanical force produced by the weight of the load 8 laid on platform 2. In the embodiment shown in FIG. 1, the strain gauges are disposed in two separate zones 11 and 12, respectively in the vicinity of the first end 7 and the second end 10 of the flexion bar 4, at equal distances from the middle of the bar. Zones 11 and 12 are situated on one of the faces of the flexion bar 4 which are parallel to platform 2.

A secondary blade 13, of flat and wide shape, as shown in the Figure, is disposed spaced apart from the flexion bar 4 in a plane substantially perpendicular to direction 5 of the force to be measured. The secondary blade 13 is resiliently deformable by flexion and is fixed respectively by its first end 14 to the mobile upright 6 and by its second end 15 to the fixed upright 9. The secondary blade 13 is substantially parallel to the flexion bar 4, from which it is separated by a distance D in the direction 5 of the force to be measured.

When load 8 is moved from its central position, shown with broken lines in FIG. 1, towards laterally off-centered positions 16 and 17, load 8 produces a torsional torque with longitudinal axis on the load cell 1. The presence of the secondary blade 13 reduces very substantially the torsion angle of the load cell produced by the torsional torque of load 8 along the longitudinal axis. The result is that the presence of the secondary blade 13 makes the effect of the transverse off-centering of the load 8 on platform 2 practically negligible. So that the torsional forces are correctly taken up, it is advantageous to use a secondary blade 13 whose width L is the largest possible. In practice, for an application to scales comprising a platform 2 of length L1 and width L2, the length L1 being the dimension parallel to the length of the flexion bar 4 a secondary blade 13 is advantageously used whose width L is substantially constant and close to the width L2 of the load receiving platform 2.

Moreover, in order to obtain good sensitivity of the measurement of the forces, a flexion bar 4 may be advantageously used whose width is respectively reduced and whose thickness is respectively great. Under these conditions, the variations of surface length or width undergone by the strain gauges placed on the upper surface or the lower surface of the flexion bar are maximized. Simultaneously, the flexion of the bar for a given load must not be reduced, so as to maintain good sensitivity. Thus, advantageously, a secondary blade 13 may be used whose stiffness is low in comparison with the stiffness of flexion bar 4, so that the secondary blade 13 does not substantially reduce the flexion of flexion bar 4 for a given load. For that, in the direction of the flexions produced by the force to be measured such as the force of load 8, the stiffness of flexion bar 4 is chosen very much greater than the stiffness of the secondary blade 13. This difference is obtained for example by using a flexion bar 4 whose cross section has a thickness E which is respectively large with respect to its width 1, whereas the secondary blade 13 is flat and wide, i.e. it has a thickness e much smaller than its width L. The difference may be accentuated by constructing the flexion bar 4 and the secondary blade 13 from different appropriate materials.

By way of example, good results have been obtained with a load cell whose components have substantially the following dimensions, given by way of indication :
  width L of the secondary blade 13 : 44 mm,
  thickness e of the secondary blade 13 : 0.35 mm,
  width 1 of the flexion bar 4 : 18 mm,
  thickness E of the flexion bar 4 : 3 mm,
  length of the load cell : 125 mm,
  distance D between the flexion beams : 53 mm,
  material of the secondary blade 13 : steel,
  material of the flexion bar 4 : aluminium alloy such as AU4G.

When the distance D between the two flexion beams is reduced, the width L of the secondary blade 13 should be increased simultaneously so as to obtain the same insensitivity to the transverse offset of the load. Thus, for a distance D equal to about 20 mm, it is suitable to choose a width L equal to about 50 mm.

A load cell such as that described above is suitable for measuring loads up to about 5 kg.

In the above examples, the width L of the secondary blade 13, is equal to at least twice the width 1 of the flexion bar 4, whereas its thickness e is very much less than the thickness E of the flexion bar, the ratio of the thicknesses being close to 10.

A flexion bar 4 may be advantageously used whose width 1 is at least equal to twenty times its thickness E, whereas the secondary blade 13 has a width L equal to at least 50 times its thickness e. Under these conditions, when the width L of the secondary blade 13 is at least twice the width 1 of the flexion bar 4, the load cell has good measurement sensitivity and good properties of damping the mechanical oscillations.

The reduction or compensation of the disturbances introduced by off-centering of load 8 in the longitudinal direction may be provided in different ways. When a load 8 is displaced longitudinally, for example to take up its position 18 or its position 19, the presence of the secondary blade 13 reduces very substantially the deformations induced by the flexion bar 4, with respect to a load cell 1 which comprises only a single flexion bar. Longitudinal off-centering however introduces axial compression or traction forces of the flexion bar 4 and of the secondary blade 13, and a slight deformation of the flexion bar 4 may be observed, which deformation induces a variation of the measured electric signal.

To compensate for such variations due to longitudinal off-centering, a known technique may be used consisting in disposing the strain gauges in at least two zones 11, 12 offset longitudinally along the flexion bar 4 and at equal distances from the middle of said bar. Thus, the corresponding gauges of the different zones are subjected to distinct stresses during flexion of the bar 4, but the combination of the gauges produces an electric signal substantially independent of the longitudinal off-centering of the force.

Figure 15:
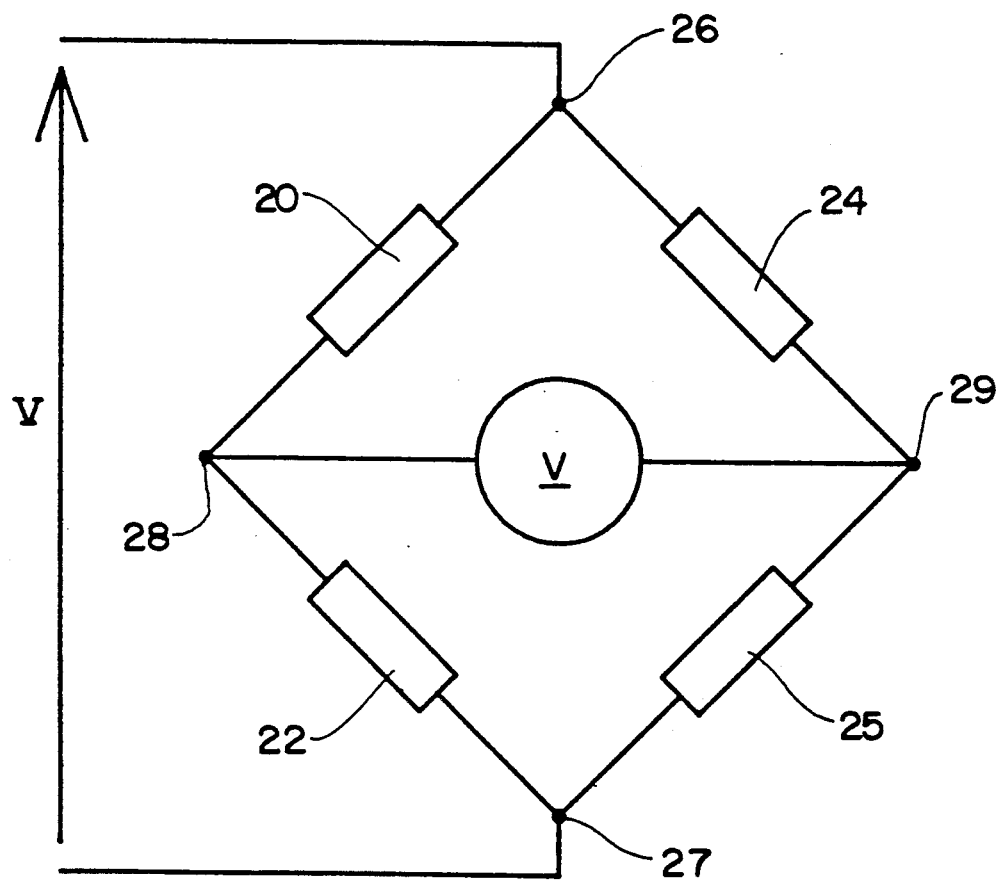
FIG. 15 illustrates the electric diagram for connecting the strain gauges.

In the embodiment shown in FIGS. 2 to 5, the flexion bar 4 carries four strain gauges disposed as follows : a first strain gauge 20 sensitive to the surface length variations of the flexion bar is fixed to the upper face 21 in the vicinity of the first end 7 of said flexion bar 4. A second gauge 22 is fixed in the same zone on the lower face 23 of the flexion bar 4. A third gauge 24 is fixed on the upper face 21 of the flexion bar in the vicinity of its second end 10, and a fourth gauge 25 is fixed in the same zone on the lower face 23 of the flexion bar. Gauges 20, 22, 24 and 25 are sensitive to the length variations of the surface of flexion bar 4. Such cells sensitive to the variations of length are well known in the technique and are shown schematically in FIGS. 4 and 5. They comprise a series of resistive filaments disposed longitudinally and connected in series between two connection terminals. The strain gauges 20, 22, 24 and 25 are connected electrically so as to form a Wheatstone bridge, as shown in FIG. 15, between two supply terminals 26 and 27, connected to an electric supply source V, and between two measurement terminals 28, 29 connected to a means v for measuring the electric signal.

The variant shown in FIGS. 6 to 11 facilitates the wiring of the gauges. In this variant, the strain gauges are divided into two zones 11 and 12, on the same upper face of the flexion bar 4, each zone 11, 12 comprises two stress gauges.

Figure 8:
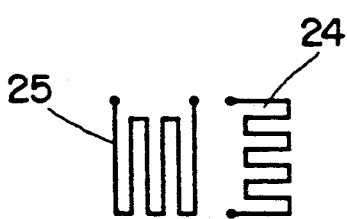
FIGS. 8 and 9 illustrate on a larger scale a possible arrangement of the strain gauges of FIG. 7.
Figure 9:
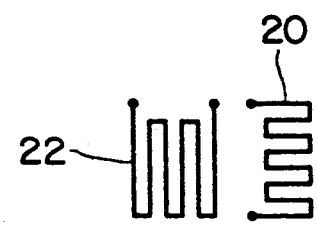

In the first embodiment shown in FIGS. 8 and 9, the strain gauges 20 and 24 are sensitive to the surface length variations of the flexion bar 4, whereas the strain gauges 22 and 25 are sensitive to the width variations of the surface of the flexion bar 4. gauges 20 and 22 are grouped together in the surface zone 11 and gauges 24 and 25 are grouped together in the surface zone 12.

Figure 10:
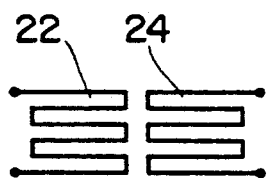
FIGS. 10 and 11 illustrate on a larger scale another possible arrangement of the strain gauges of FIG. 7.
Figure 11:
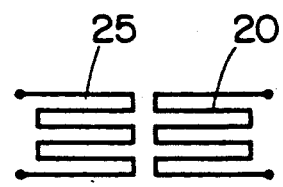
Figure 7:
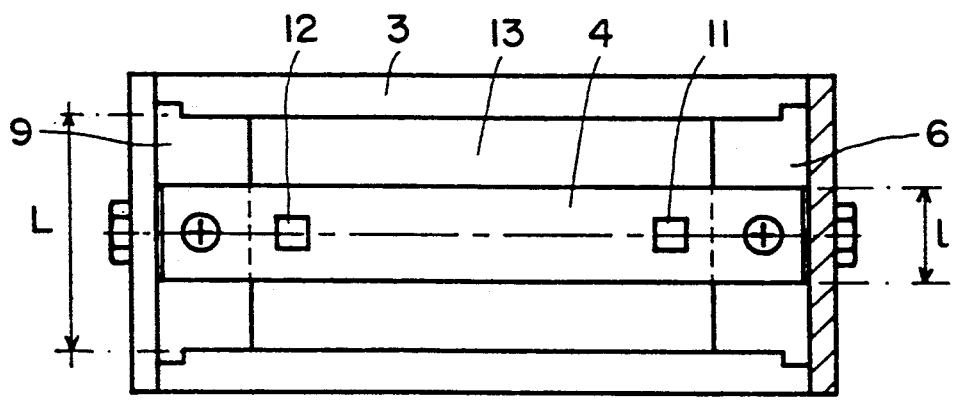
FIG. 7 is a top view of the load cell of FIG. 6, with the mobile upright in partial section.

In the embodiment of FIGS. 10 and 11, the four strain gauges 20, 22, 24 and 25 are sensitive to the length variations of the surface of the flexion bar 4. Then the gauges 20 and 25 are grouped together in surface zone 11 and gauges 22 and 24 are grouped together in surface zone 12.

In the two embodiments, the strain gauges are connected as shown in FIG. 15, so that each bridge leg, such as the leg formed by gauges 20 and 22 in series, comprises a gauge with positive resistance variation and a gauge with negative resistance variation.

Figure 12:
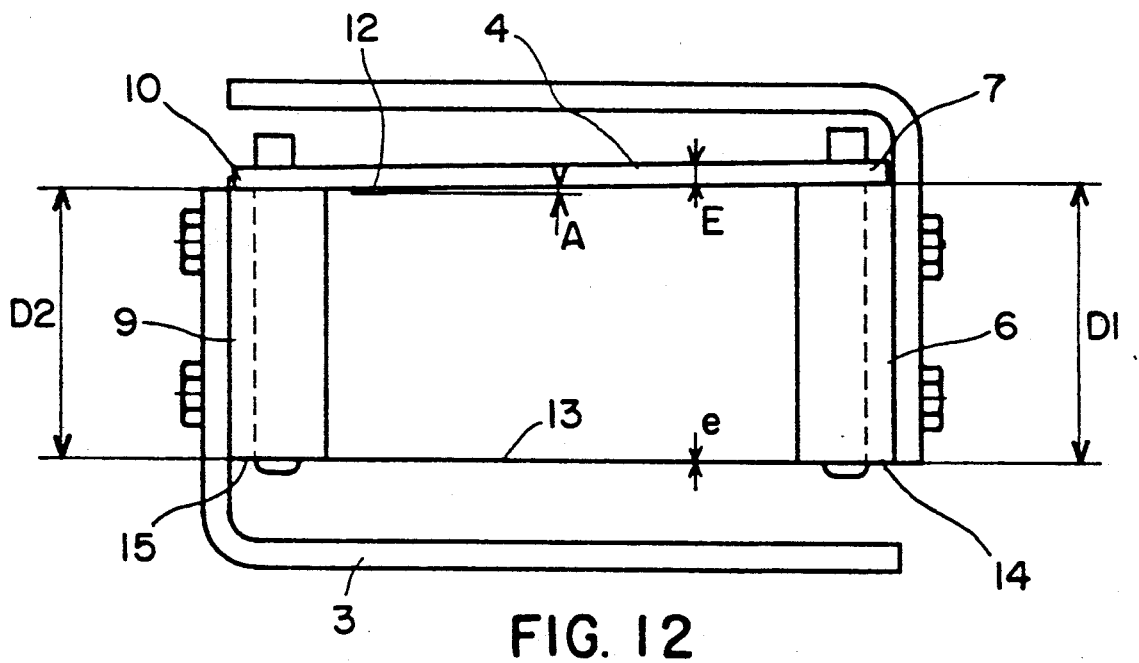
FIG. 12 illustrates schematically in a side view a load cell according to a third embodiment of the invention.
Figure 13:
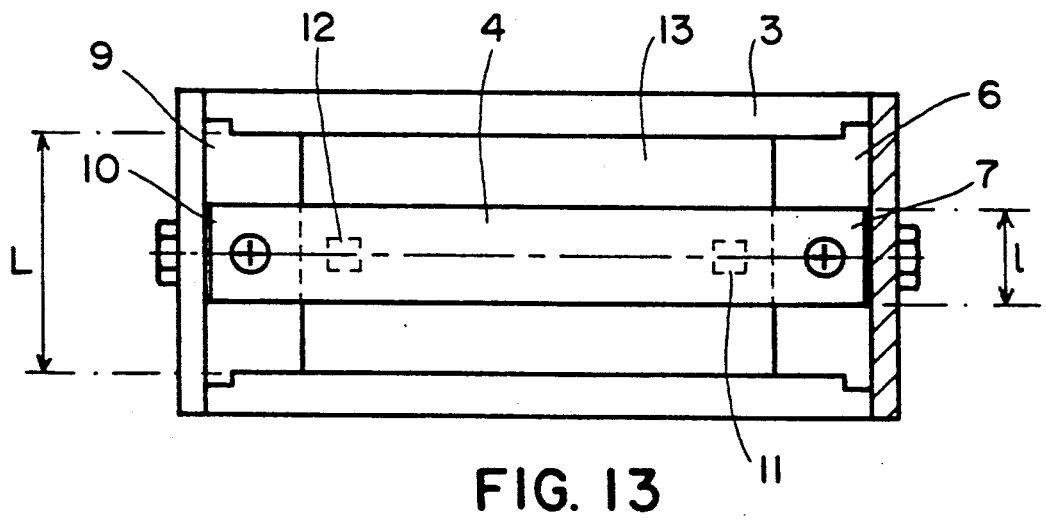
FIG. 13 shows the load cell of FIG. 12 in a top view, with the mobile upright in partial section.
Figure 14:
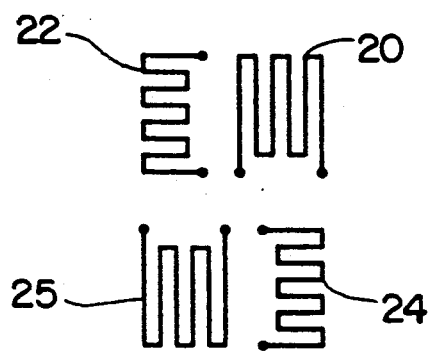
FIG. 14 shows on a larger scale the arrangement of the strain gauges of FIG. 13.

In the embodiment of FIGS. 12 to 14, the flexion bar 4 comprises four strain gauges disposed in a single zone, of reduced area, disposed in the vicinity of one or other of ends 7 and 10. For example, the four strain gauges are disposed in zone 12 close to the second end 10 of the flexion bar 4. In this case, the longitudinal load offset is compensated for by providing an angle A between flexion bar 4 and the secondary blade 13, which are then no longer parallel. For that, the first respective ends 7 and 14 of flexion bar 4 and of the secondary blade 13 are spaced apart from each other by a distance D1 greater than the distance D2 separating their second respective ends 10 and 15. The value of angle A may be determined experimentally and it depends on the geometric and dimensional characteristics of the elements forming the load cell, and in particular on the position chosen for the zone of the strain gauges. This value is generally low, for example less than a degree. The compensation effect introduced by angle A may be explained by the fact that it introduces in the zone of the strain gauges, during longitudinal compression or traction forces of the flexion bar 4, a flexional deformation in a direction opposite that of the deformation due to buckling.

In the embodiment of FIGS. 12 to 14, the strain gauges may for example be disposed as shown in FIG. 14, with two strain gauges 22 and 24 sensitive to the surface length variations of the flexion bar 4 and two strain gauges 20 and 25 sensitive to the surface width variations of the flexion bar 4.

A similar embodiment may be provided by disposing the four strain gauges in zone 11 close to the first end 7 of the flexion bar 4.

The electric connections are greatly facilitated in the embodiments of FIGS. 12 to 14 in which the four strain gauges are grouped together in a single zone.

In the embodiments which have been described, four strain gauges are advantageously used fixed on the flexion bar 4 and connected in a bridge. The arrangement of the four gauges on the bar reduces the disadvantages due to thermal drifting. Without departing from the scope of the invention, it is however possible to use only two strain gauges fixed on the same face of the flexion bar and forming a first leg of the Wheatstone bridge, for example gauges 20 and 22, the other two gauges such as gauges 24 and 25 forming the second leg of the bridge being then replaced by electric resistances of the same fixed values. This structure with two strain gauges and two resistors is applicable to each of the gauge arrangements described above and shown in the Figures.

The present invention is not limited to the embodiments which have been explicitly described, but includes the different variants and generalizations thereof contained within the scope of the following claims.

We claim:

1. A load cell with two flexion beams and strain gauges for force measurement in a weighing appliance, comprising:

a first resiliently deformable flexion beam disposed in a direction substantially perpendicular to the direction of the force to be measured, a second resiliently deformable flexion beam disposed in a direction substantially parallel to the first flexion beam, a mobile upright fixed to a first end of the flexion beams and generally parallel to the direction of the force to be measured, intended to be fixed to a platform receiving the load to be measured, a fixed upright fast with the second end of the flexion beams and generally parallel to the direction of the force to be measured, to be fixed to a base, strain gauges, fixed on the surface of the first flexion beam for electrical connection to an electric measurement circuit for delivering an electric signal as a function of the deformation by flexion of the first flexion beam under the action of the mechanical force applied between the fixed and mobile uprights; wherein:

the first flexion beam is a resiliently deformable flexion bar, which is not very flat, having a thickness E and a width 1 and carrying the strain gauges on at least one of its upper and lower faces, generally perpendicular to the direction of the force to be measured;

the second flexion beam is a resiliently flexible secondary blade, flat and wide, of small thickness e, of large width L disposed in the plane generally perpendicular to the direction of the force to be measured;

the thickness E of the flexion bar is greater than the thickness e of the blade, the width L of the blade being greater than the width 1 of the flexion bar;

the strain gauges are disposed in a single zone of the flexion bar, spaced away from the central zone, the first respective ends of the flexion bar and of the secondary blade are spaced apart from each other by a distance D1 greater than distance D2 separating their second respective ends so that the flexion bar forms with the secondary blade an angle A whose value is chosen so as to compensate for the effects of longitudinal off-centering of the force.

2. A cell as claimed in claim 1, comprising four strain gauges fixed on the flexion bar.

3. A cell as claimed in claim 1, comprising two strain gauges fixed on the flexion bar and associated with two electric resistances having the same fixed values.

4. Scales comprising:

a load cell as claimed in claim 1;

a load receiving platform fast with the mobile upright and disposed in a plane substantially parallel to the flexion bar and to the secondary blade, a base fast with the fixed upright and disposed in a plane substantially parallel to the load receiving platform, an electric circuit connecting the strain gauges in a Wheatstone bridge between two supply terminals connected to an electric supply source and between two measurement terminals connected to a means for measuring the electric signals.

5. A load cell with two flexion beams and strain gauges for force measurement in a weighing appliance, comprising:

a first resiliently deformable flexion beam disposed in a direction substantially perpendicular to the direction of the force to be measured, a second resiliently deformable flexion beam disposed in a direction substantially parallel to the first flexion beam, a mobile upright fixed to a first end of the flexion beams and generally parallel to the direction of the force to be measured, intended to be fixed to a platform receiving the load to be measured, a fixed upright fast with the second end of the flexion beams and generally parallel to the direction of the force to be measured, to be fixed to a base, strain gauges, fixed on the surface of the fist flexion beam for electrical connection to an electric measurement circuit for delivering an electric signal as a function for the deformation by flexion of the first flexion beam under the action of the mechanical force applied between the fixed and mobile uprights; wherein:

the strain gauges are disposed in a single zone of the first flexion beam, spaced away form the central zone; and the first respective ends of the first flexion beam and of the second flexion beam are spaced apart from each other by a distance D1 greater than distance D2 separating their second respective ends so that the first flexion beam forms with the second flexion beam an angle A whose value is chosen so as to compensate for the effects of longitudinal off-centering of the force.

* * * * *